May 25, 1948.  W. E. BAIER  2,442,110
PROCESS FOR THE RECOVERY OF HESPERIDIN
Filed Nov. 22, 1943
1 | SOURCE MATERIAL | — AS ORANGE PULP
2 | FIRM OR HARDEN | — AS WITH LIME
3 | EXTRACT HESPERIDIN | — AS WITH LIME
4 | SEPARATE LIQUOR |
5 | ACIDIFY | — AS WITH HCl
6 | CRYSTALLIZE | — AS AT 50°C.
7 | SEPARATE CRYSTALS |
8 | RECRYSTALLIZE | — IF DESIRED
INVENTOR
Willard E. Baier
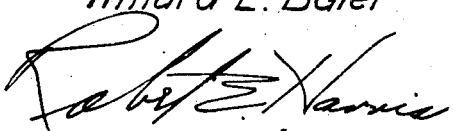
by —
Attorney Patented May 25, 1948

2,442,110

UNITED STATES PATENT OFFICE 2,442,110

PROCESS FOR THE RECOVERY OF HESPERIDIN

Willard E. Baier, Ontario, Calif., assignor to California Fruit Growers Exchange, Los Angeles, Calif., a corporation of California Application November 22, 1943, Serial No. 511,383

4 Claims. (Cl. 260—210)

This invention relates to a new and improved process for the recovery of hesperidin from plant source material.

An object of this invention is improvement in the recovery of hesperidin, with special reference to decrease in the cost of recovery and improvement in the yield, color, and purity of the hesperidin obtained.

A further object is the provision of a single direct extraction step, using as a preferred extractant an alkaline earth compound.

These and further objects and advantages will appear more fully to those skilled in the art from a consideration of the invention as set forth in the following description and in the appended claims.

The drawing is a flow sheet containing an illustrative showing of my preferred process.

Oranges are first preferably treated to remove the juice portion thereof. This may be accomplished suitably by reaming the juice portion from the fruit or by passing the whole oranges through a pulping machine or a press. If the juice portion is removed by reaming, the peel or "half shells" should preferably be disintegrated to such an extent as to be of uniformly small particle size. I have found that if the peel is passed through a press of the food chopper variety in which the faceplate has openings of about ⅜ inch in diameter, the peel particles will be very satisfactory for my purpose. This produces a representative source material, indicated at 1, on the drawing. The chopped or ground peel or pulp is then mixed with a sufficent amount of calcium hydroxide to cause a hardening, indicated at 2. With oranges as rich in acid as some California oranges, the amount of lime added at this point may suitably run as high as fifteen pounds per ton in order to alkalinize the pulp sufficiently to give the best hardening, while with some of the flatter, less acidic oranges produced commercially the amount of lime required to produce suitable hardening at this point may run down to about six pounds per ton. Intimate mixing of the lime with the peel will promote more rapid hardening. The lime, as will be readily understood, acts upon the peel by first being at least partially dissolved in the aqueous phase thereof.

The peel mixed with lime is then placed in a false bottom tank with an amount of water weighing approximately one and one-half times the weight of the peel. The water is then pumped from beneath the false bottom and recirculated over the peel. Additional quantities of calcium hydroxide are added as required, ordinarily in small amounts, to the circulating liquor until the pH of the liquor remains within the range from pH 10.8 to pH 11.4 when in equilibrium with the peel. Usually something in the neighborhood of an additional twenty-five pounds of lime per ton of orange peel will be required to bring about this desired pH range for the extraction. When equilibrium within the specified pH range has been established between the liquor and the peel, the extraction will ordinarily be satisfactorily completed. This extraction step is indicated in the drawing at 3.

The liquor is now placed in the crystallizing tank. It will not ordinarily be necessary to filter this liquor since it will have clarified itself sufficiently by being recirculated through the pulp bed in the circulation tank and simple removal of the liquor from the bottom of the false bottom tank will give satisfactory separation of the liquor from the pulp, indicated at 4. The liquor may, therefore, be acidified immediately, and without further processing, to within the desired pH range for the crystallization from it of the hesperidin which will have been extracted directly by the action of the lime upon the peel.

The liquor should be adjusted to within a range of about pH 4.5 to pH 5.0, which I find gives very good crystallization. This acidification is conveniently and economically effected with hydrochloric acid, and is indicated at 5.

After adjustment of the pH, the liquor is suitably heated to a temperature of about 50° C. and may be maintained at about this temperature during the crystallization of the hesperidin. By heating the liquor at this point the rate of crystallization is improved. Little trouble will be experienced with fermentation, which will be kept at a minimum at this temperature. Moreover, the heating at this pH will have little if any adverse effect upon the amount and quality of hesperidin recovered. Ordinarily crystallization will be relatively complete after one hour, although longer periods may be desirable in some instances. The crystallization step is indicated generally at 6. The hesperidin crystals are then separated from the mother liquor. The separation step is indicated on the flow sheet at 7. If it is desired to improve the purity of this product, purification may be effected by subsequent recrystallization steps, which are all well known and are indicated at 8.

Hesperidin is a natural glycoside occurring in most citrus fruits and having the empirical formula $C_{28}H_{34}O_{15}$. While one of the most prolific sources of hesperidin is the albedo of the citrus fruit, traces of it have been found in the juice portion of the fruit. Traces of hesperidin have also been found in the leaves, twigs, and bark of citrus trees. Other plants as, for example, some of the Umbelliferae and Scrophularia are known to contain hesperidin.

Several methods are now known for the extraction of hesperidin from its source material. In general, one such method involves crushing the material containing the hesperidin and treating the crushed material with calcium hydroxide to coagulate the pectinous or slimy components of the peel. To this material there is then added relatively large amounts of a strong alkali such as sodium hydroxide to effect solubilization and extraction of the hesperidin. The liquor containing the hesperidin is then pressed from the treated mass, clarified, and acidified with hydrochloric acid. Upon standing, crude hesperidin crystallizes from solution. This crude hesperidin is of a relatively impure nature and is ordinarily required to be subjected to subsequent purification steps.

I wish to particularly emphasize at this point that in those processes for the extraction of hesperidin in which an alkali such as sodium hydroxide is used to solubilize and extract the hesperidin, the liquor so obtained is of such a nature that it must be first clarified by filtration or other expensive means before crystallization of the hesperidin. However, in the process herein disclosed, wherein the hesperidin is extracted and solubilized by a water soluble alkaline earth hydroxide, the liquor containing the hesperidin is readily clarified by circulating it through the pulp bed in the manner just described and as part of the extraction step.

In my new process the hesperidin is extracted from its various source materials, and particularly citrus fruits, by a new and novel method which is particularly efficacious in being extremely simple and inexpensive to operate. The hesperidin obtained in the first crystallization step is relatively of very high purity compared with the product of other procedures and in many instances can be put directly into use.

I prefer, as an ordinary commercial embodiment, to use lime, i. e. calcium hydroxide, for both the hardening and the extraction, for reasons of convenience and economy. But it should be noted that any alkaline earth compound which will give sufficient cations in the aqueous medium will function to harden the pulp satisfactorily.

The addition, approximately at the time of grinding, of a sufficient portion of the lime to promote firming or hardening has the beneficial effect of making the subsequently accumulated mass of pulp more accessible to the percolation of the treating liquor. It is possible to add at this point all of the lime required. This requires careful metering of the lime to the pulp in order to give the desired final pH. In most commercial operations an easier and more certain control of the final equilibrium pH is obtained by adding only a portion of the lime prior to, at the time of, or immediately following grinding, and then adding the balance to the recirculating liquor as described above with occasional tests of the pH of the liquor.

As an alternative procedure which may prove more desirable with some arrangements of apparatus I may proceed in the following manner. The peel which has been disintegrated to a desired degree is suspended in an amount of water equal, conveniently, to one and one-half times the weight of the peel being extracted. This amount of water is specified here, as well as above, as being sufficient to give convenient handling. More would simply result in a more dilute solution of hesperidin. Sufficient calcium hydroxide is then added to the suspension, adding it in small amounts as the end point approaches, with agitation, until the pH of the liquor lies within the range of from about 10.8 to about 11.4 at equilibrium with the peel. With a reasonable amount of agitation equilibrium should be reached within a period of from one to two hours. The liquor containing the hesperidin is then separated from the pulp portion by draining and pressing. This liquor is then passed through a suitable filtering device, as, for example, a plate and frame filter press. Or if a false bottom tank is available recirculation through that is practiced, as described in detail above, to obtain a clear liquor.

While I have mentioned in the above examples the use of calcium hydroxide as a reagent suitably adapted to effect the solubilization and extraction of hesperidin from its source material, other alkaline earth compounds may be used for this purpose, as, for example, barium hydroxide or strontium hydroxide. These latter are chemically effective. Whether they will desirably be utilized will depend upon the subsequent use, if any, to which it is intended to put the residual pulp.

While magnesium acts in some respects as an alkaline earth, it has been forcefully argued that it should not be considered as belonging to the alkaline earth group. Reference to a handbook of chemistry will indeed show the hydroxides of the other alkaline earths to be much more soluble than the hydroxide of magnesium. Notwithstanding, I have found that, for example, $Mg(OH)_2$ and $MgCO_3$ may first be used to harden the peel and the solubilization and extraction of the hesperidin may be effected by adding an alkaline earth compound such as $Ca(OH)_2$ to effect the desired pH of extraction. It therefore follows that for the purpose of this process, magnesium may be considered as equivalent to an alkaline earth at the hardening step, but it is not to be so considered at the extraction step. In order to distinguish I refer to the hydroxides of calcium strontium and barium which are effective for the extraction of the hesperidin as the water soluble hydroxides.

In the examples given above, I have indicated that the desired pH range within which to effect the solubilization and extraction of the hesperidin lies within between about pH 10.8 to pH 11.4 at equilibrium. However, this step may be carried out with almost equally satisfactory results within a somewhat broader range, as, for example, pH 10.5 to pH 11.5. Extraction at points outside of this pH range, whether above or below, result in smaller yields of hesperidin.

While I have mentioned hydrochloric acid as being satisfactory for use in adjusting the pH of the liquor to within the range of about pH 4.5 to pH 5.0 for purposes of crystallization, I may use any acid which is capable of effecting the desired pH range of the liquor containing the hesperidin and which will also yield a soluble alkaline earth salt. Nitric acid, acetic acid, and others are satisfactory for this purpose. Use at this point of an acid which will yield a precipitate with the alkaline earth will introduce a filtration step into the procedure.

While the desired pH range for crystallization has been indicated as lying within about pH 4.5 to pH 5.0, it is desired to point out that crystallization may be caused by reducing the pH to 9.0 or less. The acidification should not be carried to such a point as to cause the pH to be lower than about pH 2.5. It is desired to stay above pH 2.5 to prevent destruction or breakdown of the hesperidin.

Furthermore, in the above examples I have mentioned the use of only one extraction of the source material. It is obvious, however, that repeated extractions may be carried out on the source material in a manner well known to those skilled in the art. Furthermore, I have found that additional amounts of hesperidin may be recovered by washing the extracted source material with water after the first extraction and then using this wash water to make up subsequent batches of fresh peel for extraction purposes.

The heating step performs the twofold function of speeding up crystallization and reducing the likelihood of fermentation. The temperature of 50° C. is chosen as being one which at pH 4.5 to pH 5.0 will satisfactorily retard the growth of organisms ordinarily encountered in connection with these processes. At this temperature no harm appears to be done to the hesperidin.

By the methods which I have disclosed hereinabove the source material, as, for example, citrus peel, may be subsequently readily dried and used as a stock feed. This is an advantage which does not reside with the processes previously used for the extraction of hesperidin with strong alkalies, since such processes so condition the material that it is very difficult, if not impossible, to dry. Also I wish to point out that by my method hesperidin may be recovered from its source material, as, for example, citrus peels, after the pectin has been extracted therefrom. To do this the pectin is first extracted from the peel by any of the well known processes and the pulp, after extraction, is used as the source material in the recovery of hesperidin. By my process, it is only necessary to add calcium hydroxide or other alkaline earth compounds to the peel until it is hardened and adjusted to within the desired pH range for the extraction of the hesperidin. Since the pulp residue from pectin plants is difficult to dispose of, it is particularly desirable and presents economic advantages to extract the hesperidin from this source material and by so doing the pulp is placed in a condition wherein it will readily submit to drying and may thus be dried and used for its residual value as a stock feed.

Having thus described my invention in such full, clear, concise, and exact language as to enable others skilled in the art to make and use the same, I claim as my invention and desire to secure by Letters Patent the following:

1. A process for the preparation of hesperidin which comprises the steps of adding to plant material containing an aqueous phase and also hesperidin a water soluble alkaline earth hydroxide in amounts sufficient to increase the alkalinity of the aqueous phase to within a pH range of about pH 10.8 to about pH 11.4, maintaining the so treated plant material within the said pH range for a time sufficient to permit solubilization of the hesperidin, recovering liquor containing hesperidin from said material, adjusting the pH of the liquor to within a range of from about pH 4.5 to about pH 5.0 by means of hydrochloric acid, heating said liquor to about 50° C. to hasten crystallization of the hesperidin, crystallizing hesperidin from said liquor, and finally separating the crystalline hesperidin from its mother liquor.

2. A process for the preparation of hesperidin which comprises the steps of adding to plant material containing aqueous phase and also hesperidin calcium hydroxide in amounts sufficient to increase the alkalinity of the aqueous phase to within a pH range of from about pH 10.5 to pH 11.5, maintaining the so treated plant material within said pH range for a time sufficient to solubilize the hesperidin, recovering liquor containing hesperidin from said material, adjusting the pH of the liquor to within a pH range of less than 9.0 but greater than 2.5 by means of an acid, heating said liquor to about 50° C. to hasten crystallization of the hesperidin, crystallizing hesperidin from said liquor, and finally separating the crystalline hesperidine from its mother liquor.

3. A process for the preparation of hesperidin which comprises the steps of adding to plant material containing an aqueous phase and also hesperidin a water soluble alkaline earth hydroxide in amounts sufficient to increase the alkalinity of the aqueous phase to within a pH range of about pH 10.5 to about pH 11.5, maintaining the so treated plant material within the said pH range for a time sufficient to permit solubilization of the hesperidin, recovering liquor containing hesperidin from said material, and separating hesperidin from said liquor.

4. A process for the preparation of hesperidin which comprises the steps of adding to plant material containing an aqueous phase and also hesperidin calcium hydroxide in amounts sufficient to increase the alkalinity of the aqueous phase to within a pH range of from about pH 10.5 to pH 11.5, maintaining the so treated plant material within said pH range for a time sufficient to solubilize the hesperidin, recovering liquor containing hesperidin from said material, and separating hesperidin from said liquor.

WILLARD E. BAIER.

REFERENCES CITED

The following references are of record in the file of this patent:

UNITED STATES PATENTS

| Number | Name | Date |
|---|---|---|
| 2,152,827 | Szent-Gyorgyi | Apr. 4, 1939 |
| 2,348,215 | Higby | May 9, 1944 |